United States Patent [19]
Tanaka et al.

[11] Patent Number: 5,362,287
[45] Date of Patent: Nov. 8, 1994

[54] CONTROL SYSTEM FOR AN AUTOMATIC CLUTCH OF A MOTOR VEHICLE

[75] Inventors: Hiroshi Tanaka; Maki Okayasu, both of Tokyo, Japan

[73] Assignee: Fuji Jukogyo Kabushiki Kaisha, Tokyo, Japan

[21] Appl. No.: 939,111

[22] Filed: Sep. 2, 1992

[30] Foreign Application Priority Data

Sep. 26, 1991 [JP] Japan ................... 3-274798

[51] Int. Cl.$^5$ ............................................. B60K 41/02
[52] U.S. Cl. ...................................... 477/175; 477/39; 477/179
[58] Field of Search ................. 192/0.044, 0.09, 0.052, 192/0.076; 364/426.02

[56] References Cited

U.S. PATENT DOCUMENTS

| | | | |
|---|---|---|---|
| 4,778,038 | 10/1988 | Ohkawa et al. | 192/0.044 |
| 5,031,716 | 7/1991 | Feldmann et al. | 364/426.02 X |
| 5,070,460 | 12/1991 | Yasuno | 364/426.02 |
| 5,127,501 | 7/1992 | Arikawa | 364/426.02 X |
| 5,152,191 | 10/1992 | Sato et al. | 364/426.02 X |
| 5,152,388 | 10/1992 | Soda et al. | 192/0.052 |

FOREIGN PATENT DOCUMENTS

| | | | |
|---|---|---|---|
| 61-129330 | 6/1986 | Japan . | |
| 3-200433 | 9/1991 | Japan | 192/0.044 |

*Primary Examiner*—Rodney H. Bonck
*Attorney, Agent, or Firm*—Martin A. Farber

[57] ABSTRACT

A control system of an automatic clutch for a motor vehicle has a continuously variable transmission interposed between the clutch and driving wheels, a select position sensor provided on the transmission for detecting a select position of a large reduction range and for producing a select position signal, an accelerator switch for detecting an accelerator position and for generating an accelerator signal, and a vehicle speed sensor for generating a vehicle speed signal. Tire grip condition is determined in accordance with the vehicle speed signal that wheels grip a road surface without slipping. Engine braking is detected by the accelerator signal and the select position signal. The engagement of the clutch is controlled in accordance with the grip condition and the engine braking so as to maintain an optimum control of the clutch.

17 Claims, 10 Drawing Sheets

CONTROL SYSTEM FOR AN AUTOMATIC CLUTCH OF A MOTOR VEHICLE

BACKGROUND OF THE INVENTION

The present invention relates to a control system for an automatic clutch interposed between an engine and a transmission of a motor vehicle, and particularly to a system for controlling the clutch at engine braking.

Recently, the automatic clutch is employed in the motor vehicle for smoothly transmitting power of the engine to an automatic transmission. The automatic transmission is controlled by a control system for controlling clutch torque.

There is provided an automatic transmission having a high reduction ratio range (Ds-range) for effecting the engine braking at any speed of the transmission. When the Ds-range is selected during down-hill driving, engine braking is effected by the high reduction ratio of the transmission. Thus, safe driving is insured. However, it is necessary that the vehicle is on a road having as a high a friction coefficient $\mu$ as a dry road for the engine braking.

If the Ds-range is selected during driving on such a slippery surface of the road as a snowy road having a low friction coefficient $\mu$, the large engine braking force becomes larger than the gripping force of the tires for the road surfaces so that the corresponding vehicle wheel is locked. Since the wheel skids, the wheel speed is rapidly reduced, resulting in a loss of steering the vehicle.

In the transmission having the automatic clutch, the clutch is temporarily disengaged to reduce the engine braking force. Thereafter, when the vehicle enters a dry road zone, the gripping force of the tires is restored. However, since the clutch is disengaged, the engine braking is not effected. Therefore, it is necessary to quickly control the clutch in dependency on the gripping force.

Japanese Patent Application Laid-Open 61-129330 discloses an automatic transmission system in which if the difference between the rotating speeds of the driving wheels exceeds a predetermined value, the clutch torque of a clutch is reduced.

In the system, the clutch is controlled when the wheels slip at starting or at acceleration. Therefore, the system is not available for control at the engine braking.

SUMMARY OF THE INVENTION

An object of the present invention is to provide a system for an automatic clutch which is properly controlled in dependency on gripping conditions of tires at the engine braking, thereby insuring safe driving and steerability of the vehicle as well as the engine braking effect.

According to the present invention, there is provided a control system of an automatic clutch for transmitting power of an engine to a driving wheel of a motor vehicle, comprising a continuously variable transmission interposed between the clutch and the driving wheel, a throttle sensor for detecting an opening degree of a throttle valve and for generating a throttle opening degree signal, a select position sensor provided on the transmission for detecting a select position of a driving range and for producing a select position signal, an engine speed sensor mounted on the engine for detecting an engine speed and for producing an engine speed signal, an accelerator switch for detecting an accelerator position and for generating an accelerator signal, a vehicle speed sensor for sensing a driven pulley speed of the continuously variable transmission and for generating a vehicle speed signal and, clutch control means responsive to the vehicle speed signal, the select position signal and the accelerator signal for controlling the clutch.

The system comprises tire grip determining means responsive to the vehicle speed signal for determining whether the wheel is holding road surface without slipping or not and for producing a grip signal, engine brake detecting means responsive to the accelerator signal and the select position signal for detecting an engine brake condition and for generating an engine brake signal, and correcting means responsive to the grip signal and the engine brake signal for correcting clutch current in the control means so as to maintain an optimum control of the clutch in dependency on holding condition of the road surface.

In an aspect of the invention, the correcting means operates to disengage the clutch when the holding condition decreases, and to engage the clutch when the holding condition increases.

The other objects and features of the present invention will become understood from the following description with reference to the accompanying drawings.

DETAILED DESCRIPTION OF THE PREFERRED EMBODIMENTS

Figure 1:
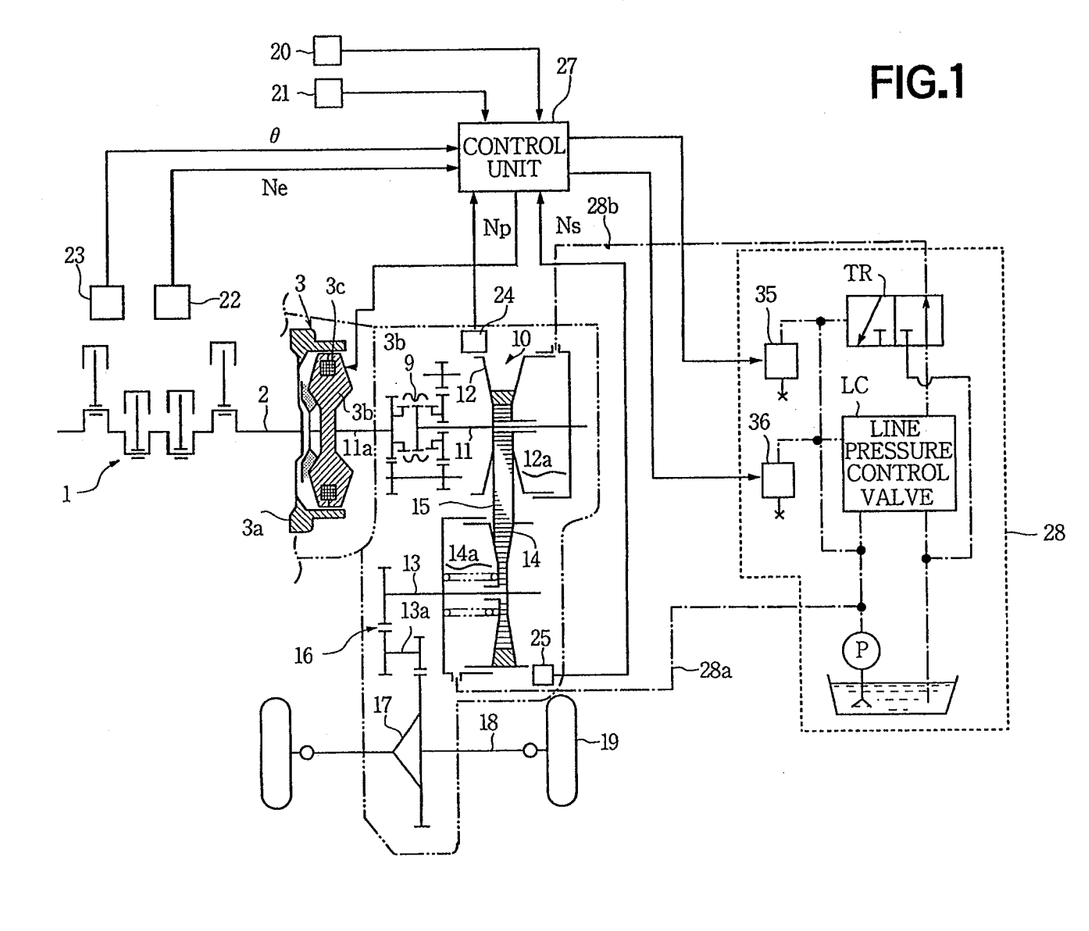
FIG. 1 is a schematic illustration of a system for controlling an electromagnetic clutch of a motor vehicle according to the present invention.

Referring to FIG. 1, showing a control system for an electromagnetic clutch for a continuously variable transmission, a crankshaft 2 of an engine 1 is operatively connected to an electromagnetic powder clutch 3 for transmitting power of the engine 1 to an electrohydrostatic controlled continuously variable transmission 10 through a selector mechanism 9. Output of the transmission 10 is transmitted to axles 18 of vehicle driving wheels 19 through an output shaft 13, a pair of intermediate reduction gears 16, an intermediate shaft 13a, and a differential 17.

The electromagnetic power clutch 3 comprises an annular drive member 3a connected to the crankshaft 2 of the engine 1, a driven member 3b secured to an input shaft 11a of the transmission 10, and a magnetizing coil 3c provided in the driven member 3b. Powdered magnetic material is provided in a gap between the drive member 3a and the driven member 3b. When the magnetizing coil 3c is excited by the clutch current, the driven member 3b is magnetized to produce a magnetic flux passing through the drive member 3a. The magnetic powder is aggregated in the gap by the magnetic flux and the driven member 3b is engaged with the drive member 3a by the powder. On the other hand, when the clutch current is cut off, the drive and driven members 3a and 3b are disengaged from one another.

In the transmission 10, the selector mechanism 9 is provided between the input shaft 11a and a main shaft 11. The selector mechanism 9 is provided with a synchromesh mechanism comprising gears, a hub, and a sleeve for connecting the input shaft 11a and the main shaft 11.

The continuously variable transmission 10 has the main shaft 11 and the output shaft 13 provided in parallel with the main shaft 11. A drive pulley 12 provided with a hydraulic cylinder 12a is mounted on the main shaft 11. A driven pulley 14 provided with a hydraulic cylinder 14a is mounted on the output shaft 13. A drive belt 15 engages with the drive pulley 12 and the driven pulley 14. Hydraulic cylinders 12a and 14a are communicated with an oil hydraulic control circuit 28 through passages 28b and 28a, respectively. The cylinder 12a is supplied with a primary pressure Pp by an oil pump P from an oil reservoir through a line pressure control valve LC and a transmission ratio control valve TR. The cylinder 14a is applied with a line pressure Ps from the pump P through the control valve LC. The hydraulic control circuit 28 is responsive to vehicle speed, engine speed and a throttle valve position for controlling the amount of oil supplied to the cylinders 12a and 14a. The pulleys 12 and 14 are operated by the cylinders 12a and 14a so that running diameter of the belt 15 is varied to infinitely change the transmission ratio (i).

An electronic control system for the electromagnetic clutch 3 and the transmission 10 has an engine speed sensor 22, and rotating speed sensors 24 and 25 for respectively sensing rotating speeds of the drive pulley 12 and the driven pulley 14. A selector lever connected to the selector mechanism 9 is provided with a select position sensor 20 for sensing operational positions of the transmission 10. An accelerator pedal switch 21 is provided for sensing depression of an accelerator pedal, and a throttle position sensor 23 is provided.

Output signals of the sensors 22-25 and pulses of the switches are applied to an electronic control unit 27 which produces a clutch current control signal supplied to the clutch 3 and a control signal for controlling the transmission ratio (i) and a line pressure control signal supplied to the control circuit 28.

Referring to FIGS. 2a and 2b showing the control unit 27 of FIG. 1, a transmission ratio changing speed control section 30 comprises an actual transmission ratio calculator 32 to which output signals $N_P$ and $N_S$ of the sensors 24, 25 are fed to produce an actual transmission ratio i in accordance with $i = N_P/N_S$. The transmission changing speed control section 30 further has a desired transmission ratio calculator 33 where a desired transmission ratio id is calculated in accordance with a desired drive pulley speed Npd, which is derived from a table, and the driven pulley speed $N_S$. The actual transmission ratio i and the desired transmission ratio id are fed to a transmission ratio changing speed calculator 34 in which a desired transmission ratio changing speed (rate) di/it is obtained in accordance with the difference between the actual transmission ratio i and the desired transmission ratio id. The actual transmission ratio i is controlled to converge to the desired transmission ratio id. A duty ratio signal dependent on the desired transmission ratio changing speed di/dt is applied to a solenoid operated valve 35. The valve 35 is provided in the hydraulic circuit, for shifting a spool of the transmission ratio control valve TR to control the transmission ratio i.

The transmission 10 has a driving position (D-range), a high engine speed driving position (Ds-range), a neutral position (N-range), a reverse driving position (R-range), and a parking position (P-range). The select position sensor 20 detects these positions and produces a select position signal which is supplied to the desired transmission ratio calculator 33. When a Ds-range select signal is supplied to the calculator 33, the desired transmission ratio id is set to a lower speed state than a predetermined transmission ratio.

A line pressure control section 31 is applied with an engine speed signal Ne from the sensor 22 and throttle opening degree $\theta$ from the sensor 23 to obtain an engine torque Te. A desired line pressure Psd is obtained in accordance with the engine torque Te and the actual transmission ratio i. A duty ratio signal corresponding to the desired line pressure Psd is applied to a solenoid operated valve 36. The valve 36 is provided in the hydraulic circuit, for shifting a spool of the line pressure control valve LC to control the line pressure.

A system for controlling the electromagnetic clutch 3 is described with reference to FIG. 2b. The control unit comprises a clutch control section 40 applied with signals from the select position sensor 20, accelerator pedal switch 21, engine speed sensor 22, throttle position sensor 23, and a vehicle speed V obtained in accordance with the driven pulley speed $N_S$. The clutch control section 40 has a reverse excitation mode determining section 41 applied with the engine speed signal Ne of the sensor 22 and drive position signals of the select position sensor 20. When the engine speed Ne is at an idling speed, or the selector lever is at the neutral position (N-range) or the parking position (P-range), the reverse excitation mode determining section 41 produces a reverse excitation signal which is applied to an output determining section 44, so that a small reverse current flows in the coil 3c of the clutch 3 through a clutch current control section 45 to release the clutch completely.

A clutch current mode determining section 42 is applied with the signals from the reverse excitation mode determining section 41 and the accelerator pedal switch 21, and a vehicle speed signal V from driven pulley speed sensor 25 for determining driving conditions such as starting mode to produce output signals. The output signals are applied to a start mode providing section 43a, a drag mode providing section 43b, and a clutch lock-up engage mode providing section 43c.

The start mode providing section 43a decides the clutch current of starting characteristics dependent on the engine speed Ne at ordinary start or at closing of a choke valve or at the operation of an air conditioner. The starting characteristics are corrected by the signals, i.e., the throttle valve opening degree $\theta$, the vehicle speed V, and the driving positions of D-range, Ds-range and R-range.

The drag mode providing section 43b decides a small drag current when the accelerator pedal is released at a low speed in each drive position for providing a drag torque to the clutch 3 for reducing clearance formed in the transmission 10 and for smoothly starting the vehicle. At the D-range, the clutch current is set to zero until a time immediately before the vehicle stops, thereby insuring a coasting effect of for the vehicle.

The clutch lock-up engage mode providing section 43c decides a lock-up current in response to the vehicle speed V and the throttle opening degree $\theta$ at each drive position for entirely engaging the clutch 3. The output signal of the sections 43a, 43b and 43c are applied to the clutch current control section 45 through the output determining section 44 to control the clutch current.

The control unit 27 has a system for controlling the electromagnetic clutch 3 in the Ds-range at engine braking.

The control unit has an engine braking mode detector 47 applied with output signals from the select position sensor 20 and the accelerator pedal switch 21. The detector 47 detects the engine braking mode and produces an engine braking mode signal, when the accelerator pedal is released in Ds-range driving. The engine braking mode signal is supplied to a clutch engagement and disengagement correcting section 50.

The control unit further has a tire grip reduction determining section 48 and a tire grip restoration determining section 49 to which a wheel speed Vw represented by the driven pulley speed Ns is applied. The tire grip reduction determining section 48 calculates an acceleration dVw/dt of the wheel speed Vw and detects a deceleration $-dVw/dt$ when the acceleration dVw/dt is smaller than zero (dVw/dt<0) and compares the deceleration $-dVw/dt$ with a predetermined set value a. When the deceleration $-dVw/dt$ is larger than the set value a ($-dVw/dt \geq a$), the determining section 48 determines that the grip of the tire is reduced. The tire grip restoration determining section 49 calculates an acceleration dVw/dt of the wheel speed Vw which is compared with a predetermined set value b. The determining section 49 determines that the grip of tire is restored when the acceleration dVw/dt is larger than the set value b (dVw/dt$\geq$b). The respective determining signals are supplied to the correcting section 50.

When the grip reduction determining signal from the section 48 is supplied to the correcting section 50 in the engine braking mode, the section 50 operates a timer 51 to set a predetermined clutch disengagement time Toff and produces a clutch disengagement signal which is supplied to the clutch current control section 45. On the other hand, when the grip restoration determining signal from the section 49 is supplied to the correcting section 50, the section 50 produces a clutch engagement signal which is supplied to the control section 45.

The operation of the system will be described hereinafter.

When the accelerator pedal is depressed at the D-range, the clutch current mode determining section 42 applies a signal to the start mode providing section 43a. A start mode control signal is fed to the clutch current driving section 45 through the output determining section 44 so that a clutch current suitable for starting the vehicle flows in the coil 3c of the clutch 3. When the vehicle speed V reaches a predetermined speed, a signal is supplied to the lock-up engage mode providing section 43c so that a large lock-up current for completely engaging the clutch flows to lock up the clutch 3. When the accelerator pedal is released at a predetermined low vehicle speed, a signal is supplied to the drag mode providing section 43b so that a small drag current flows in the coil 3c to disengage the clutch 3, thereby preventing the engine from stalling. The small drag torque is produced to reduce mechanical play formed in the transmission. When the P-range or N-range is selected at a low engine speed, the reverse excitation mode determining section 41 produces a reverse excitation signal which is applied to the output determining section 44 so that a small reverse current flows in the coil 3c to excite the coil in reverse. The residual magnet of the clutch 3 is accordingly removed to completely disengaged the clutch 3.

When the clutch 3 is engaged, the power of the engine 1 is transmitted to the driving wheels 19 through the continuously variable transmission 10 controlled by the transmission changing speed control section 30 and the line pressure control section 31 to start the vehicle.

The line pressure control section 31 produces the duty ratio signal corresponding to the desired line pressure which is applied to the solenoid operated valve 36 for controlling the line pressure.

The transmission ratio changing speed control section 30 controls the desired transmission ratio id in the entire range of the transmission at the D-range. At the stop and the starting of the engine, the desired transmission ratio id is determined at the maximum transmission ratio (low speed state). As the vehicle speed increases with increase of the primary pulley speed Np, the desired transmission ratio id reduces. The transmission ratio changing speed signal di/dt obtained in accordance with the desired transmission ratio id and the actual transmission ratio i is supplied to the solenoid operated valve 35 for increasing the primary pressure Pp exerted on the primary pulley 12. The belt 15 is shifted to the side of the primary pulley 12 to increase the diameter of the pulley 12, thereby upshifting the transmission to a smaller transmission ratio (high speed state). When the vehicle speed is reduced at deceleration, the desired transmission ratio id is set to a low speed, thereby downshifting the transmission.

When the vehicle is driven down a slope at the Ds-range by releasing the accelerator pedal, the desired transmission ratio id is controlled to a lower speed than a previous transmission ratio. Thus, the primary pressure Pp is lowered to forcibly downshift the transmission, so that the engine braking is effected.

In this state, the control of the clutch 3 is corrected in dependency on the wheel speed Vw. The correcting operation of the clutch will be described hereinafter with reference to the flowchart of FIG. 3.

Figure 3:
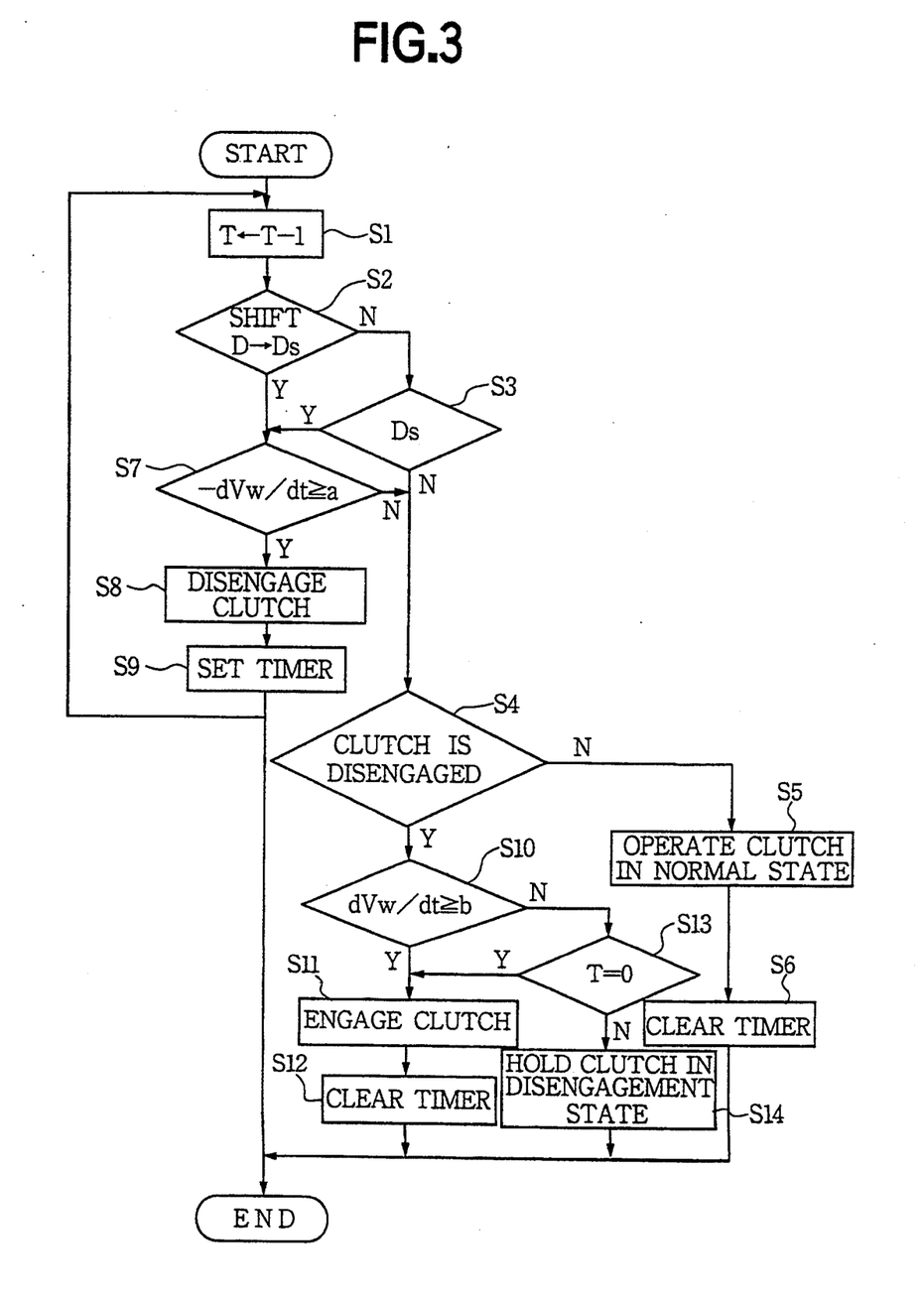
FIG. 3 is a flowchart showing an operation of the system at engine braking.

At a step S2, it is determined whether the drive position is shifted to the Ds-range from the D-range or not. If there is no shift operation, the program goes to a step S3 where it is determined whether the drive position is at the Ds-range or not. If the D-range is selected, the program proceeds to a step S4 where it is determined whether the clutch 3 is disengaged or not. If not, the program proceeds to a step S5 where the clutch is normally operated. At a step S6, the timer is cleared.

To the contrary, when the Ds-range is selected at the step S2 or step S3, the program proceeds to a step S7 where it is determined whether the deceleration $-dVw/dt$ at engine braking is higher than the set value a or not. When the vehicle is driven on the dry road, the grip of the tires is sufficiently larger than the engine braking force. Therefore, the wheel speed Vw is decelerated at a deceleration −dVw/dt lower than the set value a. Thus, the engine brake is normally effected. The program goes to the step S5 through the step S4.

Figure 4:
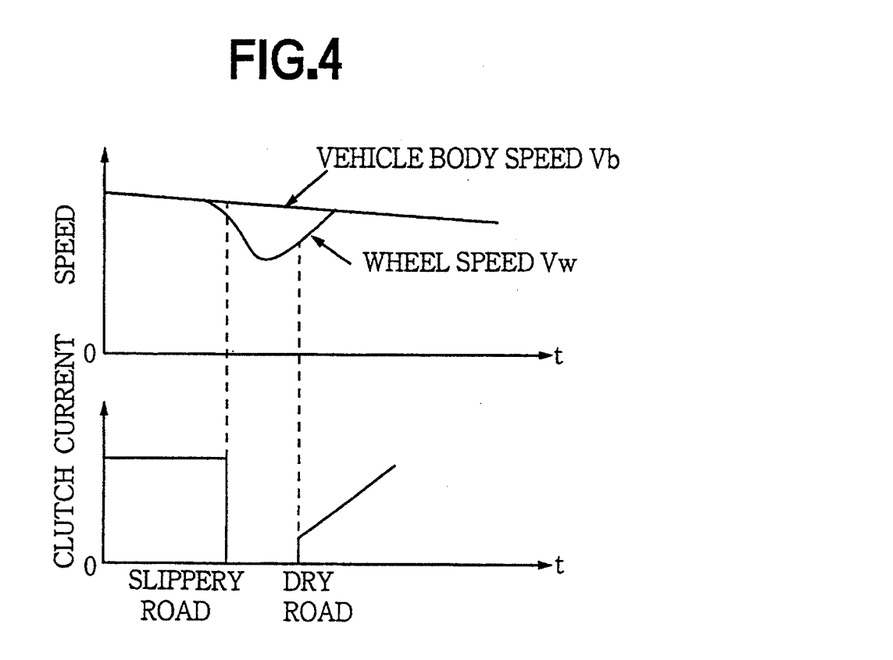
FIG. 4 shows graphs showing a time chart of an operation for rapidly restoring a wheel speed.

However, if the road changes to a slippery road, the grip of tires reduces. Accordingly the speed of the wheels largely reduce or the wheels are locked by the engine braking. The wheel speed Vw is rapidly lowered compared with a vehicle body speed Vb at a deceleration −dVw/dt higher than the set value a as shown in FIG. 4. If −dVw/dt≧a at the step S7, the program goes to a step S8 where the clutch 3 is immediately disengaged in accordance with the clutch disengagement signal as shown in FIG. 4. Thus, the power of the engine 1 is not transmitted to the wheels 19 so that engine braking on the wheels does not take place. Accordingly, the grip of the tires is restored, thereby insuring the driving stability and steerability of the vehicle. At a step S9, the timer is set to a predetermined period Toff for disengaging the clutch. The program returns to a step S1.

When the clutch is disengaged, the wheel speed Vw is increased to lower the deceleration dVw/dt. The program goes to a step S10 from the step S7 through the step S4. At the step S10, the acceleration dVw/dt is determined in accordance with the set value b. When the vehicle is driven on the dry road from the slippery road, the grip of the tire is restored. If acceleration dVw/dt≧b, the program goes to s step S11 where the clutch is immediately engaged in accordance with the engagement signal. At a step S12, the timer is cleared. The engine 1 is connected to the wheels 19 so that the engine braking acts on the wheels at the Ds-range.

Figure 5:
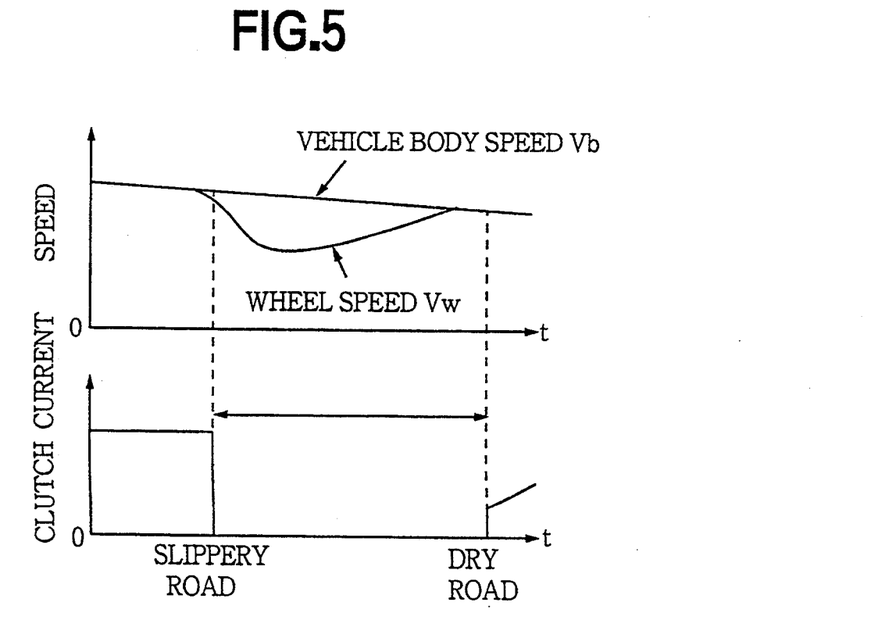
FIG. 5 shows the graphs showing the time chart of the operation for slowly restoring the wheel speed.

When the vehicle is still driven on the slippery road and the acceleration dVw/dt is lower than the set value b at the step S10 as shown in FIG. 5, the program proceeds to a step S13. At the step S13, it is determined whether the set time Toff has passed or not (T=0). If not, the program goes to a step S14 where the clutch is held in the disengagement state. If the set time passes, the program goes to the step S11 and the step S12. Thus, the clutch 3 is engaged to effect the engine braking as shown in FIG. 5.

Figure 6:
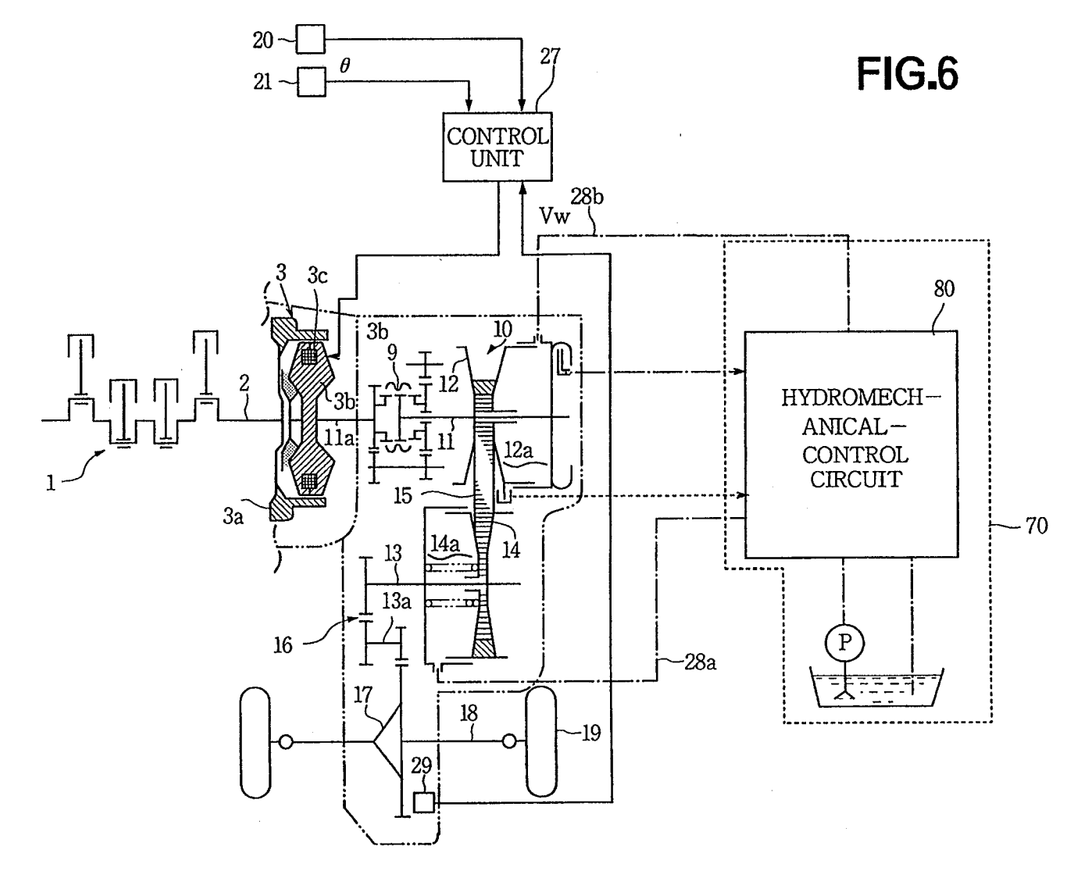
FIG. 6 is a schematic illustration showing a second embodiment having a system for controlling an electromagnetic clutch with a hydromechanically controlled continuously valuable transmission.
Figure 7:
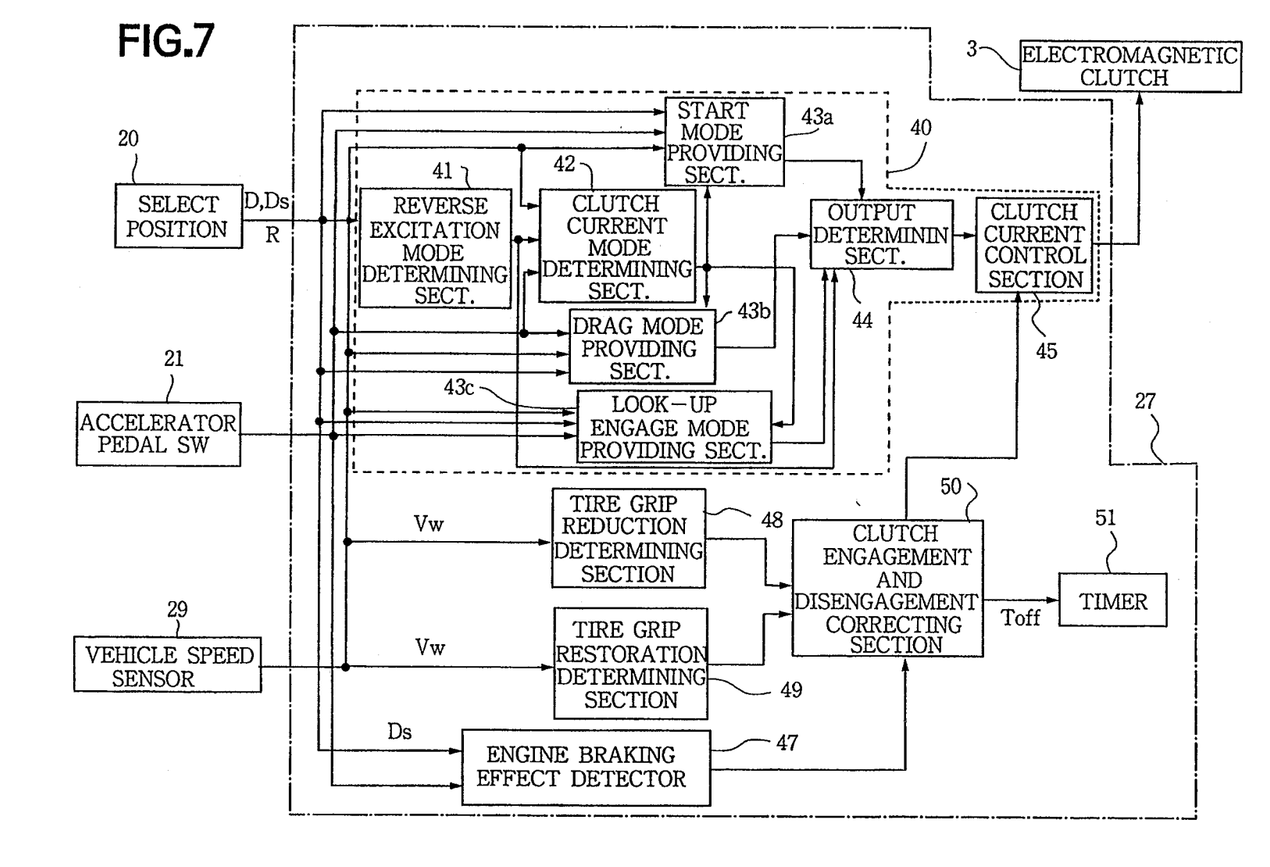
FIG. 7 shows a block diagram of a control unit of the second embodiment.

Referring to FIG. 6 and FIG. 7 showing the second embodiment of the present invention, the clutch control system of the present invention is applied to a hydromechanically controlled continuously variable transmission. A detail of the hydromechanically controlled continuously valuable transmission is described in U.S. Pat. No. 4,948,370 which is hereby incorporated by reference by the applicant of the present invention. In the second embodiment, the control system is applied with a vehicle speed sensor 29 instead of the driven pulley speed sensor 25 and substitutes the output of the accelerator pedal switch 21 for the output of the throttle position sensor 23. The vehicle speed sensor detects the wheel speed Vw and supplies the wheel speed Vw to the tire grip reduction determining section 48 and the tire grip determining section 49. After that, the operation of the second embodiment proceeds in the same manner as the operation of the first embodiment.

Figure 8:
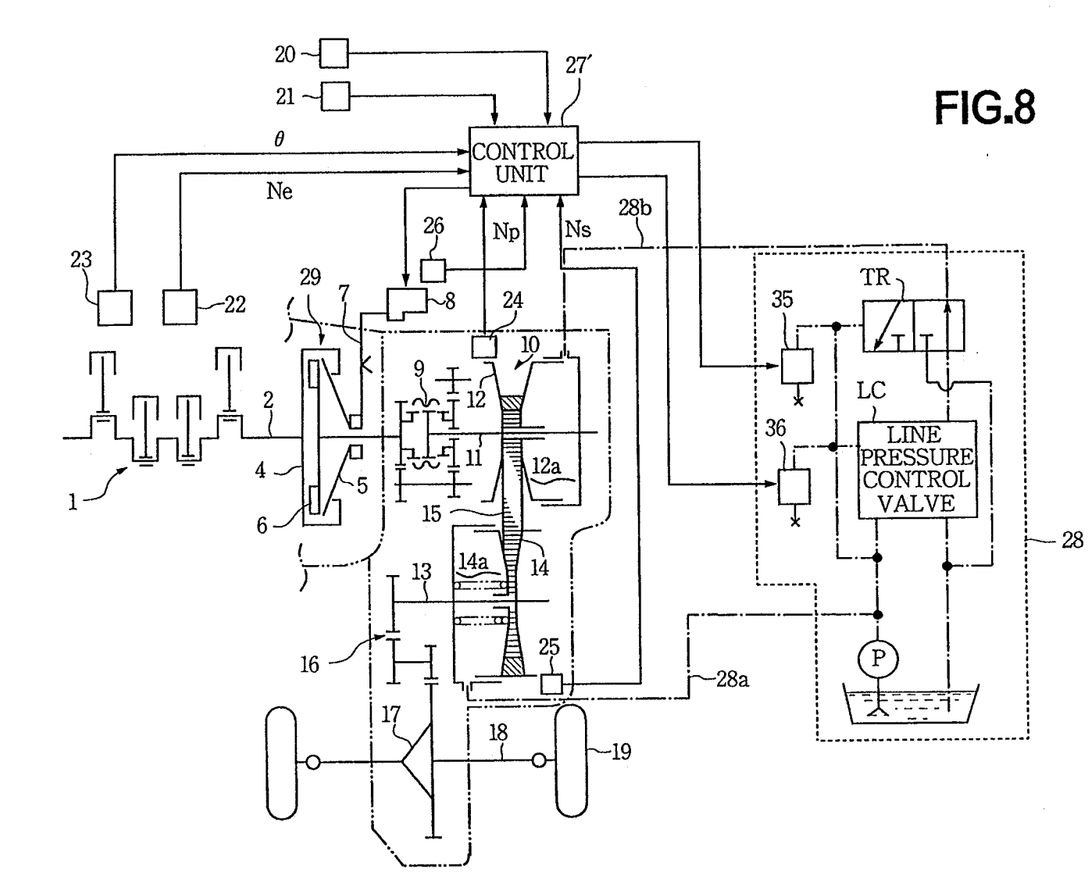
FIG. 8 is a schematic illustration showing a third embodiment having the system for controlling a friction clutch.

Referring to FIG. 8 showing the third embodiment, a control system of the third embodiment has a dry-plate friction clutch 29 which is operatively connected to the crankshaft 2 of the engine 1 for transmitting the power of the engine 1 to the continuously variable transmission 10 through the selector mechanism 9.

The dry-plate friction clutch 29 comprises a flywheel 4 connected to the crankshaft 2 of the engine 1, a pressure plate 6 opposed to the flywheel 4 and secured to an input shaft 11a of the transmission 10, and a diaphragm spring 5. The diaphragm spring 5 is operated by a release lever 7 connected with a DC motor 8 as an actuator. The DC motor 8 is actuated by drive pulses, and the rotation thereof is converted into a rectilinear motion by a converting device so as to lineally shift the release lever 7. When the drive pulses are cutoff, the rotation of the DC motor 8 is stopped by a braking device provided therein to hold the release lever 7 at the position. For example, when the DC motor 8 is rotated in one direction, the diaphragm spring 5 is actuated by the release lever 7 to push the pressure plate 6 against the flywheel 4. Thus, the clutch 29 is mechanically engaged by a frictional force, thereby transmitting the output of the crankshaft 2 to the input shaft 11a. On the other hand, when the DC motor 8 is rotated in the opposite direction, the clutch 29 is disengaged. The duty ratio of the drive pulses applied to the motor 8 is variable so as to control the shifting speed.

Figure 9:
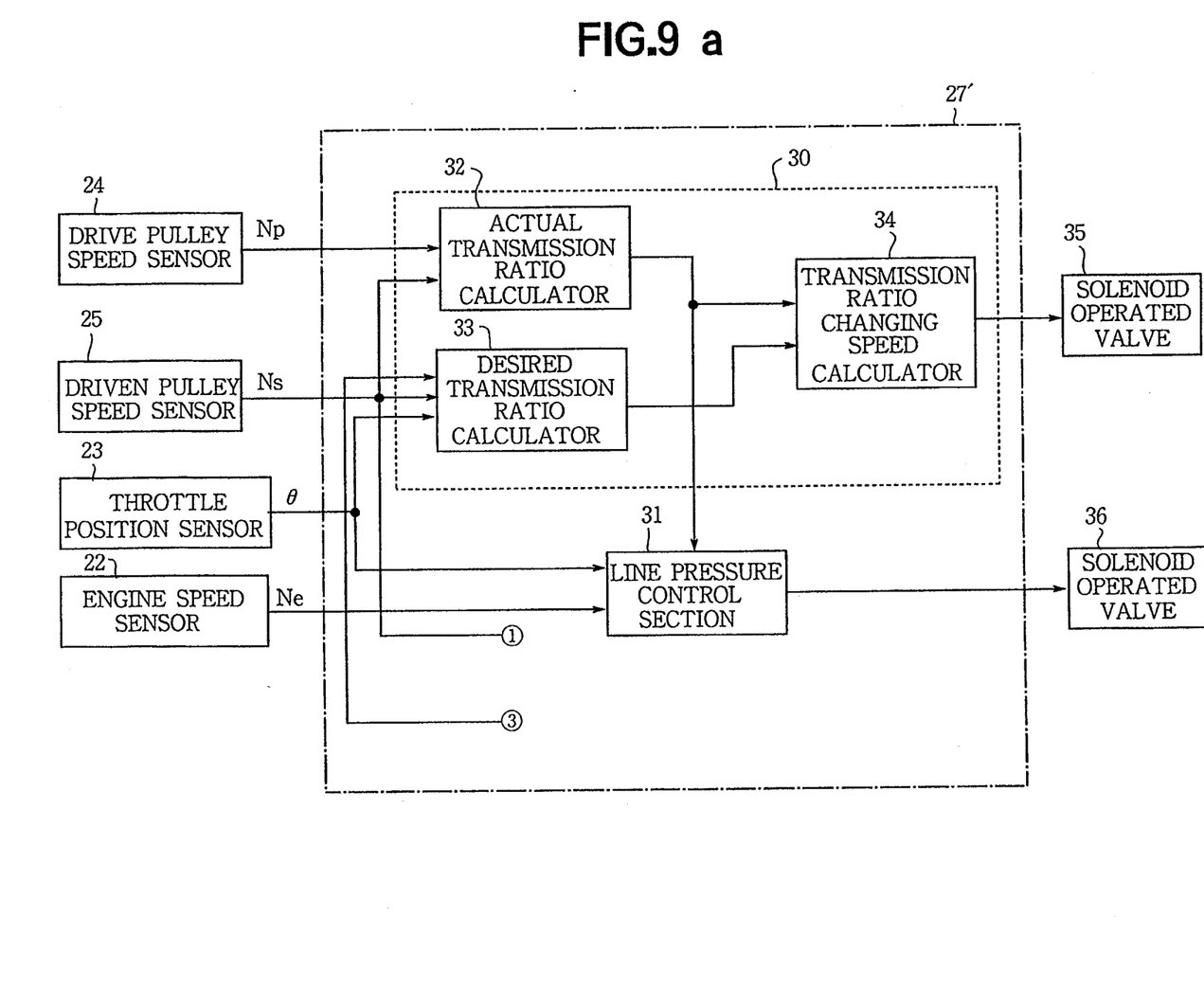
FIGS. 9a and 9b show a block diagram of a control unit of the third embodiment.

An electronic control system for controlling the clutch 29 is described with reference to FIG. 9. The system further has a clutch position sensor 26 for detecting the position of the clutch 29 in dependency on the operation of the DC motor 8. A control unit 27' comprises a clutch control section 60 for controlling the DC motor 8 of the clutch 29. The clutch control section 60 has a clutch disengagement mode determining section 61, a clutch partial engagement mode determining section 62, and a clutch engagement mode determining section 63 which are respectively applied with signals from the select position sensor 20 and the accelerator pedal switch 21, and the vehicle speed signal from the driven pulley speed sensor 25. In the control section 60, the disengagement mode, the partial engagement mode, and the engagement mode of the clutch 29 are determined in accordance with the operations of the select lever and the accelerator pedal by the driver and the driving conditions. The respective mode signals are supplied to a desired clutch position determining section 64 where a desired clutch position Sd is determined based on the input mode signals. A desired position signal Sd is fed to a motor control section 65.

The control unit 27' is provided with an actual clutch position detector 46 to which a clutch position signal from the clutch position sensor 26 is supplied for detecting an actual clutch position S. An actual position signal S is supplied to the motor control section 65. The motor control section 65 calculates the difference ΔS between the desired clutch position Sd and the actual clutch positions S and produces a motor control signal of a duty ratio corresponding to the difference ΔS. The motor control signal is supplied to the DC motor 8 for operating the clutch 29.

Figure 2:
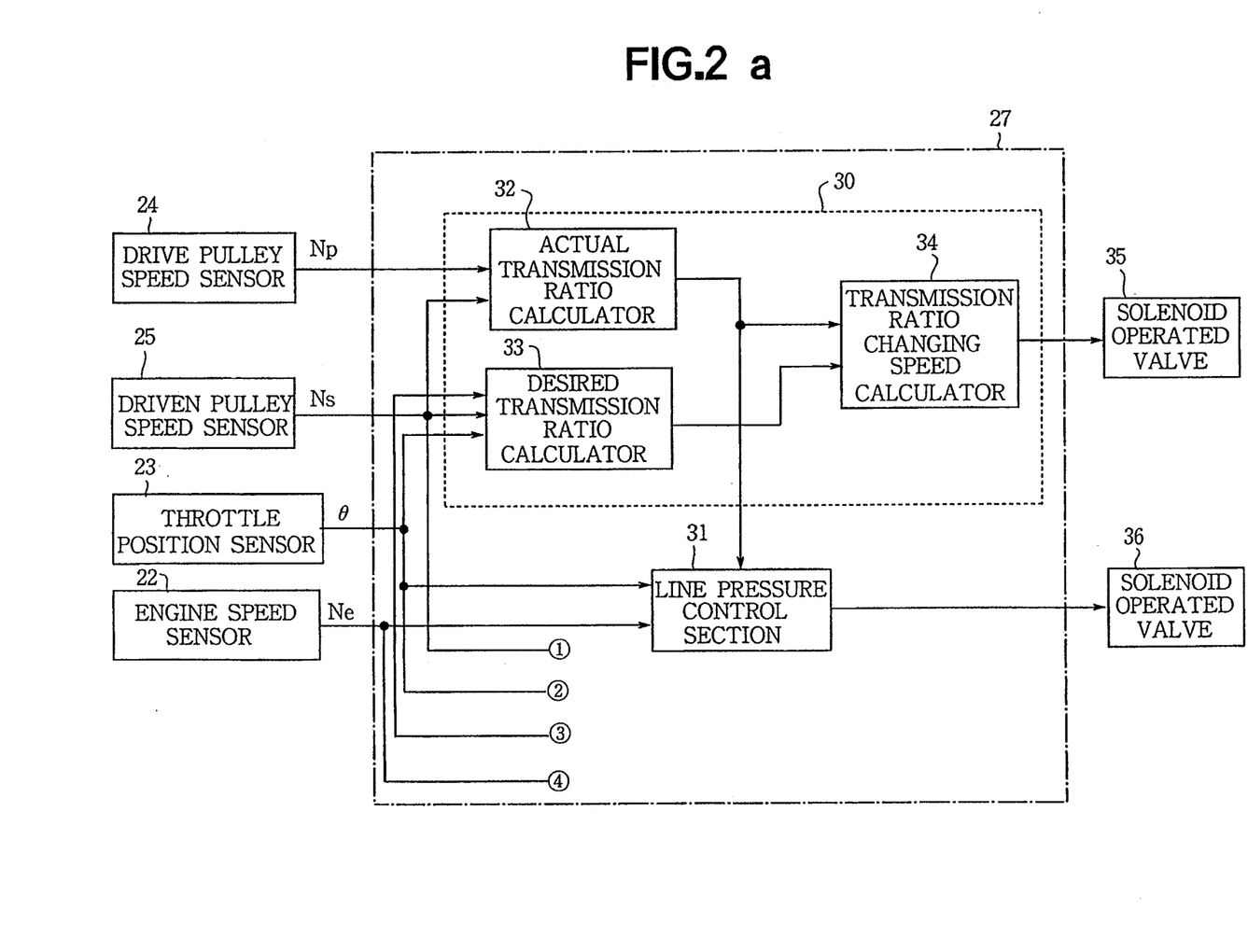
FIGS. 2a and 2b show a block diagram of a control unit of the system.

The other structures are the same as the first embodiment and the same parts thereof are identified with the same reference numerals as FIGS. 1 and 2.

In the control unit 27', the signal from the clutch correcting section 50 is supplied to the motor control section 65.

Describing the operation of controlling the clutch 29, when the D-range is selected and the accelerator pedal is depressed, the clutch partial engagement mode determining section 62 determines the partial engagement mode of the clutch. The desired clutch position determining section 64 calculates the clutch position Sd in the partial engagement which is supplied to the motor control section 65. Thus, the DC motor 8 is gradually rotated in a direction to partially engage the clutch.

When the vehicle speed reaches a predetermined speed, the clutch engagement mode determining section 63 determines that the clutch 29 is to be entirely engaged.

When the clutch engagement mode is determined, the desired clutch position Sd is set at the maximum value at the section 64. Thus, the motor is further rotated and the clutch 29 is entirely engaged and held in the engagement state thereafter.

When the accelerator pedal is released at deceleration at a predetermined vehicle speed, the clutch disengagement mode is determined at the clutch disengagement mode determining section 61. The clutch desired position Sd is set at the minimum value so that the motor 8 is rotated in the reverse direction to disengage the clutch, thereby preventing the engine from stalling.

The operation of the clutch 29 at engine braking is the same as the first embodiment.

In accordance with the present invention, if the wheel speed is rapidly lowered in the engine braking effect mode, the clutch is disengaged so as to prevent the wheel speed from decreasing. Thus, driving stability and steerability are insured, thereby improving safe driving of the vehicle. When the grip of the tire is restored, the clutch is immediately engaged to effect the engine braking. Furthermore, if the wheel speed is not sufficiently restored, the clutch is operated to be engaged after a predetermined time passes. Thus, the engine braking is properly effected.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling an automatic clutch for transmitting power of an engine to an automatic transmission of a vehicle having a drive wheel connected to the transmission, comprising:
   engine braking mode detecting means for detecting if said engine is in an engine braking mode;
   tire grip determining means responsive to a function of speed of the drive wheel for determining tire gripping condition of the drive wheel on a road surface and for producing a grip signal;
   correcting means responsive to said grip signal when said engine is in the engine braking mode for controlling said clutch in dependency on the tire gripping condition of said road surface; and
   said correcting means for disengaging said clutch when the tire gripping condition of the drive wheel on the road surface is poor and to engage said clutch a predetermined time after said clutch is disengaged before said function of drive wheel speed recovers to a value for causing said correcting means to engage said clutch.

2. A system for controlling an automatic clutch for transmitting power of an engine to an automatic transmission of a vehicle, comprising:
   engine braking mode detecting means for detecting if said engine is in an engine braking mode;
   tire grip reduction determining means responsive to a deceleration of a drive wheel of said vehicle for determining if tire grip of said drive wheel is reduced;
   clutch disengagement control means for disengaging said automatic clutch when it is determined by said tire grip reduction determining means that the tire grip is reduce din said engine braking mode;
   tire grip restoration determining means responsive to an acceleration of said drive wheel for determining if the tire grip of said drive wheel is restored after the disengagement of said automatic clutch by said control means; and
   clutch engagement control means for engaging said automatic clutch when it is determined by said tire grip restoration determining means that the tire grip is restored, for said engine braking mode.

3. The system according to claim 2, wherein said automatic clutch which is controlled by the system is an electromagnetic power clutch.

4. The system according to claim 2, wherein said automatic clutch which is controlled by the system is a dry-plate friction clutch.

5. The system according to claim 2, wherein said automatic transmission, to which the clutch which is controlled by the system transmits the power of the engine, is a continuously variable transmission.

6. The system according to claim 2, further comprising:
   drive wheel speed detecting means for detecting drive wheel speed;
   wherein said tire grip reduction determining means calculates said deceleration in response to said drive wheel speed detected by said drive wheel speed detecting means and compares said calculated deceleration with a first set value to determine if the tire grip is reduced; and wherein
   said tire grip restoration determining means calculates said acceleration in response to said drive wheel speed detected by said drive wheel speed detecting means and compares said calculated acceleration with a second set value to determine if the tire grip is restored.

7. The system according to claim 2, further comprising:
   an accelerator pedal switch for producing a depression signal indicative of depression of an accelerator pedal, and
   wherein said engine braking mode detecting means is responsive to absence of said depression signal to detect said engine braking mode.

8. The system according to claim 7, wherein said automatic transmission is operated under one of a normal driving position and a high speed driving position, said system further comprising:
   a select position sensor for producing an indicative signal representing that said automatic transmission is operated under said high speed driving position; and
   wherein said engine braking mode detecting means is responsive to said indicative signal to recognize said engine braking mode.

9. The system according to claim 2, wherein
   said clutch engagement control means is for engaging said automatic clutch a predetermined time period after tire grip reduction is determined by said tire grip reduction determining means even when it is not determined by said tire grip restoration determining means that the tire grip is restored, for said engine braking mode.

10. A system for controlling an automatic clutch for transmitting power of an engine to an automatic transmission of a vehicle, comprising:

engine braking mode detecting means for detecting if said engine is in an engine braking mode;

tire grip reduction determining means responsive to a deceleration of a drive wheel of said vehicle for determining if tire grip of said drive wheel is reduced;

clutch disengagement control means for disengaging said automatic clutch when it is determined by said tire grip reduction determining means that the tire grip is reduced in said engine braking mode;

tire grip restoration determining means responsive to an acceleration of said drive wheel for determining if the tire grip of said drive wheel is restored after the disengagement of said automatic clutch by said control means; and clutch engagement control means for engaging said automatic clutch for said engine braking mode a predetermined time period after disengaging said automatic clutch when it is determined by said tire grip reduction determining means that the tire grip is reduced, even when it is not determined by said tire grip restoration determining means that the tire grip is restored.

11. The system according to claim 10, wherein said automatic clutch which is controlled by the system is an electromagnetic power clutch.

12. The system according to claim 10, wherein said automatic clutch which is controlled by the system is a dry-plate friction clutch.

13. The system according to claim 10, wherein said automatic transmission, to which the clutch which is controlled by the system transmits the power of the engine, is a continuously variable transmission.

14. The system according to claim 10, further comprising:

drive wheel speed detecting means for detecting drive wheel speed;

wherein said tire grip reduction determining means calculates said deceleration in response to said drive wheel speed detected by said drive wheel speed detecting means and compares said calculated deceleration with a first set value to determine if the tire grip is reduced; and wherein said tire grip restoration determining means calculates said acceleration in response to said drive wheel speed detected by said drive wheel speed detecting means and compares said calculated acceleration with a second set value to determine if the tire grip is restored.

15. The system according to claim 10, further comprising:

an accelerator pedal switch for producing a depression signal indicative of depression of an accelerator pedal, and wherein said engine braking mode detecting means is responsive to absence of said depression signal to detect said engine braking mode.

16. The system according to claim 15, wherein said automatic transmission is operated under one of a normal driving position and a high speed driving position, said system further comprising:

a select position sensor for producing an indicative signal representing that said automatic transmission is operated under said high speed driving position; and wherein said engine braking mode detecting means is responsive to said indicative signal to recognize said engine braking mode.

17. The system according to claim 10, wherein
said clutch engagement control means is for engaging aid automatic clutch when it is determined by said tire grip restoration determining means that the tire grip is restored, for said engine braking mode.

* * * * *